Sept. 30, 1941.    R. B. FAGEOL    2,257,495
AUTOMOBILE BUFFER
Filed Sept. 18, 1939
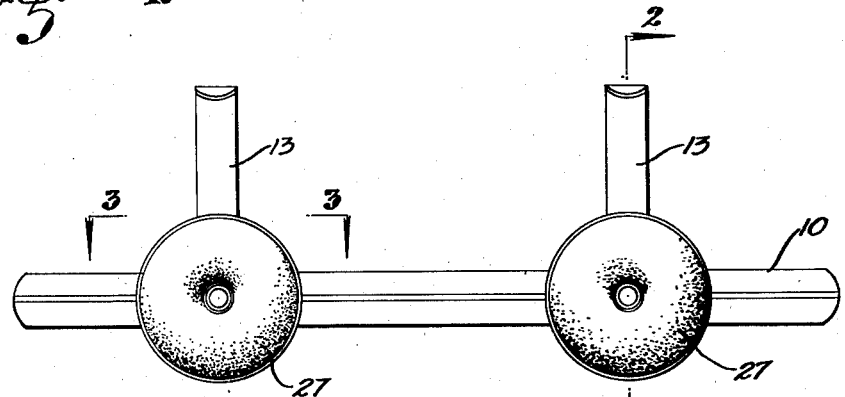
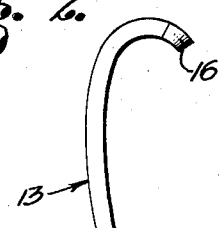
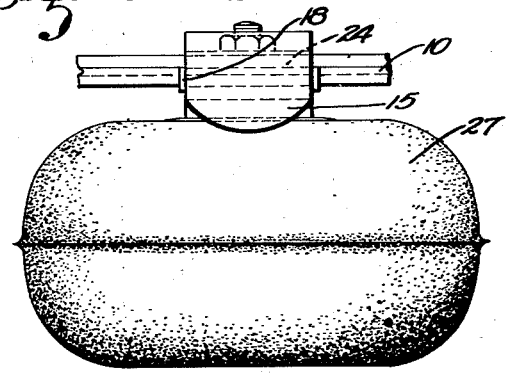
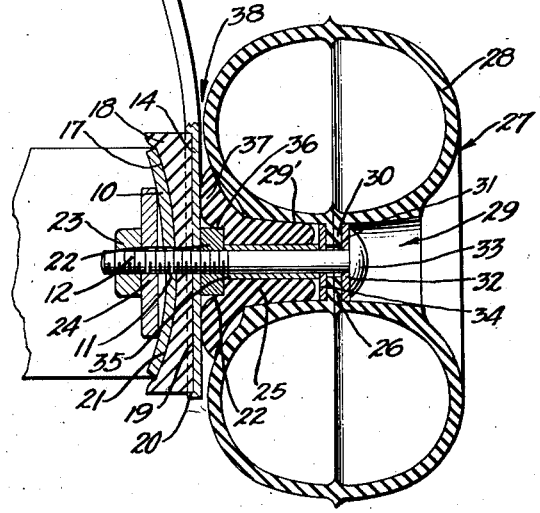
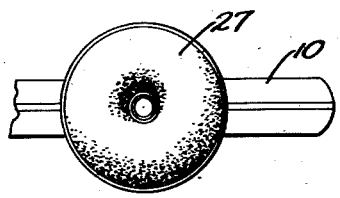
INVENTOR
ROLLIE B. FAGEOL
BY James M. Abbett
ATTORNEY Patented Sept. 30, 1941

2,257,495

UNITED STATES PATENT OFFICE 2,257,495

AUTOMOBILE BUFFER

Rollie B. Fageol, Beverly Hills, Calif.

Application September 18, 1939, Serial No. 295,436

5 Claims. (Cl. 293—55)

This invention relates to automobile construction and particularly pertains to an automobile buffer of the type shown in my co-pending application Serial No. 164,722 filed September 20, 1937, entitled "Nonhook, nonskid bumper construction," Patent No. 2,173,642, Sept. 19, 1939, and my co-pending application Serial No. 279,882, entitled "Shock absorbing element," filed by me on the 19th day of June, 1939.

In the applications for U. S. Letters Patents above mentioned types of automobile buffers were claimed which were designed to be applied to the horizontally disposed impact bars of automobile bumpers with which automobiles are usually equipped. In the structures there disclosed a device was provided for installation on the impact face of an automobile bumper, the structure including an air cushion confined within an expansible rubber container, the overall dimensions of said container being greater than the vertical width of an automobile bumper, whereby the structure when mounted upon the impact face of an automobile bumper would extend a material distance above and below the horizontal edges of a bumper bar and provide a suitable substitute for the metal cleats which now are applied to the impact faces of a bumper bar and extend vertically above and below the bar. These cleats are used to compensate for variation in horizontal level of bumper bars on colliding vehicles. It is the object of the present invention to provide a buffer structure embodying the impact absorbing features of the aforementioned applications together with the use of a metal cleat and details of construction whereby the buffer, the metal cleat and the mountings therefor may be universally applicable to bumper bars of various width and sectional convexity.

The present invention contemplates the provision of a yieldable mounting structure, a metal buffer cleat and a cushion buffer structure, both of which are held in place upon the impact bar of a buffer by the mounting structure.

The invention is illustrated by way of example in the accompanying drawing, in which:

Figure 1 is a view in elevation showing the application of the present invention to a bumper bar.

Fig. 2 is an enlarged view in central vertical section through the buffer structure as seen on the line 2—2 of Fig. 1.

Fig. 3 is a view in plan showing the buffer structure as seen on the line 3—3 of Fig. 1.

Fig. 4 is a view in elevation showing the buffer mounted on a bumper without a guard bar.

Referring more particularly to the drawing, 10 indicates a bumper bar. Such a bar is disposed in a horizontal plane and supported transversely of the frame of an automobile. The supporting brackets are not here shown. The bumper bars 10 are usually constructed of spring steel and have an arcuate vertical cross-section so that a convexed impact face is presented outwardly. A hole 11 is formed through the bumper bar to receive a bolt 12. The bolts usually used with said structure hold a vertically extending cleat in position transversely of the impact face of the bar. These cleats usually extend above and below the bumper bar. In the present instance cleats 13 are provided which extend transversely of the bar and project upwardly above the bar but do not necessarily project below the bar. The cleat 13 here shown has a lower flat portion 14 which extends upwardly and provides a curved portion 15 terminating at its upper end in an outwardly extending hook 16. Interposed between the lower flat portion 14 of the cleat 13 and the arcuate face 17 of the bumper bar is a mounting block 18. This mounting block has a front face 19 formed with a central vertical groove 20 therein to receive the straight portion 14 of the cleat 13. The rear face of the mounting block is concave, as indicated at 21, and is described by an arc of lesser radius than the arc of the impact face 17 of the bumper bar. The mounting block 18 is made of rubber, thus when the mounting block is drawn tightly against the face 17 of the bumper bar the rubber will be deformed to insure that the mounting block 18 will firmly conform to the arcuate face of the bumper. This makes it possible for the mounting block to be used on a variety of bumper bars of different sectional formation and eliminates a necessity for the construction of separate mounting blocks for bumpers of various individual designs. The block 18 carries a nut 22 which is drawn against the front face of the portion 14 of the cleat and cooperates with the nut 23 at the end of the bolt to hold the cleat 13, the mounting block 18 and a back plate 24 in a tightly clamped relation to the bumper bar 10, irrespective of any other attachments which may be placed upon the bolt. The portion of the bolt 12 extending forwardly from the nut 23 passes through a mounting cone 25 and the web 26 of the cushion buffer element 27. In Figure 1 of the drawing two of these cushion elements are shown as mounted upon a bumper bar, said elements being associated with complementary cleats 13.

The cushion buffer element 27 is of the same general construction as that described in the aforementioned co-pending applications. Its dimensions, however, are slightly different, particularly due to the fact that the overall diameter of the buffer is relatively small since the cleat 13 supplements its guarding action above the bumper. The buffer structure is made of rubber and has an annular wall 28 of substantially circular cross-section, the outside diameter of the circular section being less than one-half of the overall diameter of the buffer, whereby a central passageway 29 will occur in the buffer structure. This passageway is interrupted by a transverse partition web 30 which lies along the equatorial center of the buffer and in a vertical plane transversely of the central axis of the buffer structure. An opening 31 is formed through this web and receives the bolt 12. In the central passageway 29 a washer 32 is positioned and against the outer face of which the head 33 of the bolt rests. The washer 32 is drawn against the front face of the web 30. A washer 34 is mounted on the bolt and is drawn against the back face of the web 30 by a nut 36. A bushing 35 is interposed between the nut 36 and the washer 34. The nut 36 is carried by the bolt 12 and when it is tightened in position will securely clamp the web 30 of the buffer between the washers 32 and 34.

The central passageway 29 in the buffer structure is substantially cylindrically and the portion of the passageway occurring between the cleat 13 and the web 30 is indicated at 29'. This passageway receives the small end of the frusto-conical mounting member 25. The outwardly flaring base portion conforms to the concavity produced by the back face of the annular buffer structure 28. A bushing 35 rests against the washer 34 and it is held in position by the nut 22 which seats within a recess 39 in the base of the cone member 25. The length of the frusto-conical member 25 is such as to insure that the base face 37 of the cone will lie in a plane outside of the plane of the back face of the buffer structure. The depth of the recess 39 is less than the thickness of the nut 22 so that the back of the nut 22 will bear against the cleat and exert a clamping action thereagainst while the base face 37 of the member 25 is spaced from the face of the cleat and the plane of the back of the buffer is also spaced from the plane of the cleat as indicated at 38.

In operation of the present invention the cleat 13 and the buffer structure 27 are constructed as shown in the drawing. Any desired amount of air is sealed in the annular chamber 28 of the buffer structure, after which the bolt carrying the washer 32 is positioned through the opening 31 in the web 30 and then the washer 34 is mounted against the web 30. The nut 36 is then placed on the bolt and tightened to clamp the web 30 between the two washers 32 and 34 while applying end thrust to the bushing. The mounting cone 25 is then mounted upon the bolt and seated firmly in the opening 29' of the buffer structure, where it is clamped by the nut 22. The bolt 12 is then placed through the central openings in the cleat 13, the mounting block 18, the opening 11 in the bumper bar and the opening through the back plate 24. While these elements are loosely arranged and assembled on the bolt the concaved face 21 of the mounting block 18 will not conform to the concaved face 17 since the concaved face 21 is described by a shorter arc than the concave face 17. The nut 23 is then tightened on the bolt 12. This will cause the cleat 13, the mounting block 18 and the back plate 24 to be drawn together with relation to the bumper bar 10. This action will deform the arcuate face 21 of the mounting block 18 so that it will accurately conform to and be pressed against the arcuate face 17 of the bumper bar.

With the buffer in position it will be evident that any colliding object which is in the horizontal plane occupied by the buffers 27 will encounter the buffer 27 and transmit the force of collision thereto. When this takes place the buffer will be deformed, since its walls are made of rubber devoid of nonstretching reinforcement. In the event that the colliding object slides over the top of the buffer it will encounter the cleat 13 and further dissipate the force of collision. It will be evident that since the cleat 13 is made of spring steel it may flex as it is struck. The portion 15 will flex toward the supporting vehicle and eventually will encounter the hooked end portion 16 of the cleat 13 which will tend to limit any further movement.

It will thus be seen that the structure here disclosed is simple in construction and arrangement, that it provides a pneumatic shock absorbing buffer carried by a bumper and interposed between the vehicle carrying it and a colliding object whereby a material portion of the shock will be dissipated without damaging the vehicle, and that in the event the colliding object moves over the buffer it will then be engaged by the guard cleats 13 which will tend to retard further movement.

While I have shown the preferred form of my invention as now known to me, it will be understood that various changes may be made in combination, construction and arrangement of parts by those skilled in the art, without departing from the spirit of my invention as claimed.

Having thus described my invention, what I claim and desire to secure by Letters Patent is:

1. In combination with an automobile bumper bar having a vertically convex impact face, a buffer structure to be mounted thereon, an intermediate mounting block of deformable material interposed between the buffer and the convexed face of the bumper bar, the face of the mounting block which contacts with the face of the bumper bar being concaved and struck by shorter radius than the radius of the bumper bar face, and a bolt engaging the buffer structure and passing through the mounting block and the bumper, whereby the mounting block will be drawn against the bumper to rigidly hold the same and to cause the concaved face of the mounting block to conform to the convexed face of the bumper bar.

2. In combination with a bumper bar having a convexed impact face, a buffer structure to be mounted upon said bar and against said impact face, said buffer structure including a mounting block having a relatively flat front face, a vertical plane and a concaved back face described by a lesser radius than that of the convexed front face of the bumper bar, said mounting block being formed of deformable material, a vertically disposed metal cleat extending transversely of the flat front face of the mounting block, a cushion buffer disposed in advance of the cleat, and a bolt engaging the cushion buffer and the cleat and passing through the mounting block and the bumper bar, whereby the buffer and the cleat will be drawn together and against the mounting block and the mounting block will be forced to conform to the convex face of the bumper bar and be there held.

3. In combination with the impact bar of an automobile bumper, a buffer structure comprising an annular deformable pneumatic cushion, a bolt passing centrally therethrough, a head on the bolt securing the cushion member in fixed relation on the bolt, a frusto-conical mounting block disposed on the bolt and in an abutting relation to the bumper and fitting into a concavity on the back of the cushion member, a nut on the bolt clamping the cone member into position, and a nut on the bolt for clamping the structure onto the bumper bar.

4. In combination with the impact bar of an automobile bumper, a buffer structure comprising an annular deformable pneumatic cushion, a bolt passing centrally therethrough, a head on the bolt securing the cushion member in fixed relation on the bolt, a frusto-conical mounting block disposed on the bolt and in an abutting relation to the bumper and fitting into a concavity on the back of the cushion member, a nut on the bolt clamping the cone member into position, a nut on the bolt for clamping the structure onto the bumper bar, and a resilient mounting block through which the bolt extends and which block is interposed between the bumper bar and the cone member, whereby the resilient block may be caused to conform to the impact surface of the bumper bar and be firmly held thereagainst.

5. The combination as set forth in claim 4, and a metal cleat interposed between the intermediate nut on the bolt and the mounting block to be held thereby.

ROLLIE B. FAGEOL.